June 16, 1931.                R. ECK                1,810,821
                    ELECTRICALLY OPERATED WINDLASS
                          Filed July 20, 1927
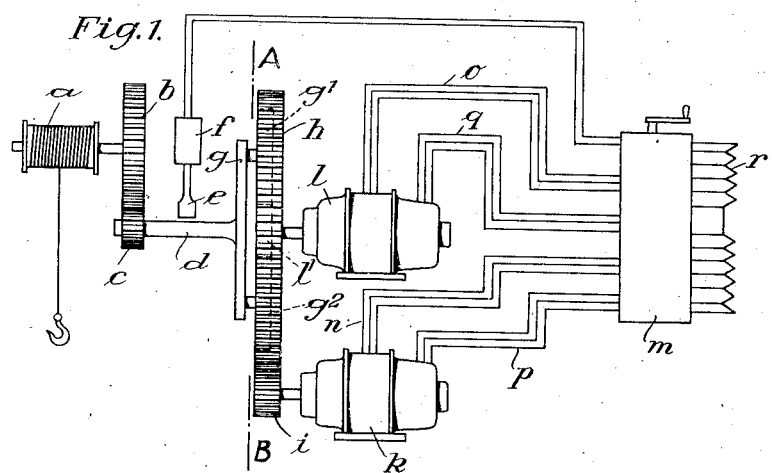
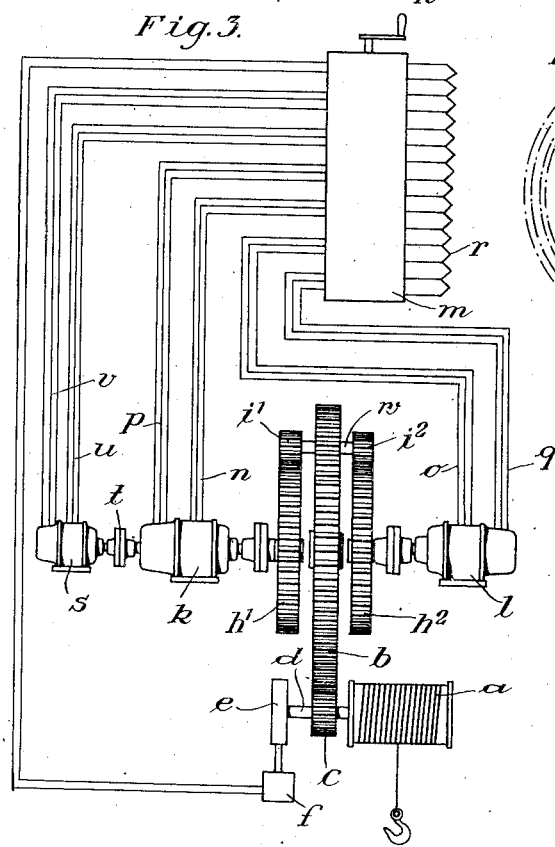
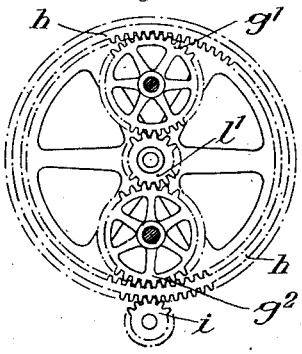
INVENTOR.
RICHARD ECK
BY
ATTORNEY Patented June 16, 1931

1,810,821

UNITED STATES PATENT OFFICE

RICHARD ECK, OF DRESDEN, GERMANY, ASSIGNOR OF ONE-HALF TO FRIEDRICH ADOLF RICHARD GÄBEL, OF DRESDEN, GERMANY

ELECTRICALLY OPERATED WINDLASS

Application filed July 20, 1927, Serial No. 207,251, and in Germany July 2, 1927.

My invention relates to a new method of and apparatus for controlling or actuating an electrically operated windlass of a lifting plant and resides more particularly in adapting three-phase asychronous motors for the purpose. Generally speaking, three-phase asynchronous motors are not adapted at the present state of the art, for satisfactory use in lifting apparatus, because they do not allow of any ample control of the lifting speed as required in foundry-cranes, mounting cranes and the like. It has been suggested heretofore to overcome this drawback by employing two asynchronous motors in connection with a balancing gear, for actuating the windlass and to start in practice, one of the motors only in order to impart to the load a certain low speed, and to then increase the lifting speed to the maximum limit by starting the other motor.

This suggestion, however, is objectionable on account of the necessity of starting the motors under load. The disadvantages resulting therefrom are considerable and mainly reside in the necessity for the development of a high starting torque by the motor and the employment of correspondingly high starting currents and variations of voltage therewith at the switching-on operation, so that the first motor usually starts up with an intermittent motion or jerks and the security in service is thereby seriously impaired.

The chief object of my invention is to remedy this defect. With this object in view I control, while employing two asynchronous motors and a balancing gear for driving the rope drum, the lifting speed in a manner that the two motors are started at the same time but in such a direction of rotation as to neutralize or balance the rotary movements thereof under the action of the said balancing gear. The windlass, therefore, will at first remain at rest and the two motors will start without load. For the purpose of accelerating the load the revolving speed of the one motor then is reduced to zero and thereupon increased again, in the opposite direction, to the maximum value.

In order to cause the load or work to be lifted as gently as possibly can be done with an apparatus of this character, and as is required particularly in the handling of delicate molded and cast articles, a drop of the revolving speed of the controlling motor is accomplished, in accordance with the present invention, by subjecting it to a braking effect produced by reversing the direction of current supplied thereto, but, at the same time, causing the drop to be effected in a curve of greatest possible flatness by applying to the shaft of the controlling or regulating motor an additional turning effort by means of an auxiliary power medium, i. e., the auxiliary motor $s$, acting in opposition to the braking effect aforesaid of the newly introduced current and which will tend to maintain the original revolving speed. To this end, as small auxiliary motor, above referred to, will be employed and is connected to the controlling or regulating motor either directly or by any suitable indirect means. By the alternate action of this reversed current, supplied to the current or regulating motor and the opposing rotating effort of the auxiliary power medium, the acceleration of the load can be graded in a most accurate and delicate manner.

With the above recited object in view, reference is had to the following specification and drawings in which there are exhibited two examples or embodiments of suitable devices and mechanisms for carrying out my improved method but which are in no way intended as a limitation upon the scope of the appended claim as it is to be clearly understood that variations and modifications which fairly fall within the true scope of said claim may be resorted to when found expedient.

In the accompanying drawings forming a part of this specification and showing diagrammatically, for purposes of exemplification, a preferred form and manner in which the invention may be embodied and practised, but without limiting the claimed invention to such illustrative instances:

Figure 1 is a side view of the apparatus or mechanism for carrying out the new method of controlling or regulating the operation of a windlass without the use of an auxiliary motor;

Figure 2 is a sectional view, taken on the line A—B in Figure 1; and

Figure 3 is a view similar to Figure 1, but showing a modified form of the invention wherein an auxiliary motor is employed for the purpose set forth.

Referring to Figures 1 and 2, $a$ denotes the rope drum of the windlass mounted and adapted to be driven by a suitable intermediate gear comprising, in the shown instance, two intermeshing toothed wheels $b$ and $c$. The shaft $d$ of the wheel $c$ is subjected to the action of a brake $e$ controlled by a braking magnet $f$ duly connected with a source of electric energy, and the shaft $d$ is driven by the motors $k$ and $l$ through the intermediary agency of the members $g$, $h$ and $i$, as will be clearly understood on inspection of Figure 1. The rim of the member or wheel $h$ possesses teeth on the inner and on the outer circumference and the member or pinion $i$ on the shaft of the motor $k$ engages with the outer teeth of the wheel $b$, whilst intermediate pinions $g^1$ and $g^2$ loosely mounted on horizontal arms or pins of the member or disk $g$ mesh with the inner teeth of the wheel $h$. The two pinions $g^1$ and $g^2$ are driven in opposite directions by a pinion $l^1$ engaging therewith and keyed to the shaft of the motor $l$.

The one of the two motors $k$ and $l$ is driven in lifting direction and the other one is driven in lowering direction. When the two motors run at equal speed the action thereof will be neutralized or balanced and the windlass is at rest. When it is desired to lift a load or work, the turning momentum or revolving speed of the "lowering" motor $k$ is reduced and when a load or work hung upon the hook of the rope, is to be lowered, the revolving speed of the "lifting" motor is decreased. If the one or the other motor is at rest, the load or work will be moved at half speed, and if the same motor is then caused to run at increased speed in the opposite direction, the load or work will be given or adopt a maximum speed at full speed of the said motor. I provide a controlling drum $m$ equipped with suitable regulating resistances $r$ for controlling and regulating the revolving speed and for operating the braking magnet $f$. The wiring $n$ and $o$ connects the drum $m$ with the stators of the two motors, respectively, whilst the wiring $n$ and $o$ connects the same with the rotors thereof, respectively.

In operation, the two motors, which preferably are of like power and equal speed, are to be started at the same time. The rotary speed which the disk $h$ and the shaft $d$ would be given by the motor $l$, if the motor $k$ were at rest, is neutralized or balanced by the rim of the wheel $h$ moving in opposite direction when the motor $k$ is running so as to drive the wheel by means of the pinion $i$, and the shaft $d$ and disk $h$ remain at rest from the first. The motors thus run on no load. In order to prevent, in case of a suspended load or work, the lowering of the same, the brake remains closed at first. The speed of the one or the other motor is then reduced by switching in resistances and at the same time the brake $e$ is deenergized. The difference between the speeds of the two motors is transmitted to the disk $g$ and causes the rope drum $a$ to revolve through the intermediary of the shaft $d$ and the gearing $c$, $b$.

In the modification illustrated in Figure 3, the rope drum $a$ and the pinion $c$ are keyed to the shaft $d$ and the brake $c$, controlled by the magnet $f$, is mounted as before to exert a braking action on the shaft when required. The toothed wheels $b^1$ and $b^2$ are in engagement with pinions $i^1$ and $i^2$ to form a balancing gear, since the latter are keyed to one and the same shaft $w$ mounted to revolve in a suitable bearing provided for the purpose in the main wheel $b$, while the cooperating wheels $h^1$ and $h^2$ are keyed to the shafts of the two motors $k$ and $l$, respectively. Now, when the two motors run in the same direction, the shaft $w$ will run idle, while the main wheel $b$ and consequently the rope drum $a$ will be at rest. If, however, say the motor $k$ is at rest, the pinion $i^1$ will revolve about the wheel $h^1$ and cause, through the agency of the shaft $w$, the main wheel $b$ to rotate, so that the rope drum $a$ will be driven by the pinion $c$ meshing with the wheel $b$. When, however, the motor $k$ runs together with the motor $l$ and in the same direction as the main wheel $b$, the speed of the latter will be increased accordingly.

The controlling and regulating device $m$ provided with suitable resistances $r$ as shown in Figure 3, is, as regards construction and arrangement, similar to that illustrated in Figure 1. The wires $n$ and $o$ connect the resistances with the stators of the two motors, respectively, and the wires $n$ and $o$ connect the resistances with the rotors of the two motors, respectively. In this modification, as shown in Figure 3, an auxiliary motor $s$ is coupled with the motor $k$ and separate wires $u$ and $y$ are provided to connect the stator and the rotor of the motor $s$, respectively, with the controlling resistances $r$.

In operation, the two motors $k$ and $l$ are started at the same time and controlled through the medium of the gearing, comprising the wheels $h^1$, $i^1$ and $h^2$, $i^2$ to run at equal speed whilst the auxiliary motor $s$ is at first left switched off, so that the resulting effect of the speed of the two motors is neutralized or balanced at this condition of the plant, with the brake switched on. Thereupon, the speed of one of the two motors, say the motor $k$, is reduced by the braking effect produced by reversing the current supplied to the running motor $k$, and at the same time the brake $c$ is switched off and the auxiliary motor $s$ started to run in the same direction of the running motor $k$ so that the gear comprising the wheels $b$ and $c$, and consequently the rope drum $a$ will be actuated. The motor $l$ works for lifting and the motor $k$ for lowering purposes, and that under the action of the load momentum, while the friction of the gearings and the reversed current in the motor $k$ acts in opposition to the said load momentum. As soon as the two last-mentioned forced (friction and counter or reversed current) effect a balance of the said load momentum, the motor $k$ will tend to come to rest. In order to prevent the motor $k$ from actually coming to rest too quick or abruptly and the load from being accelerated by jerks, the auxiliary motor $s$ is now switched on to assist in behalf of the load momentum. The motor $s$ thus acts in opposition to the counter or reversed current of the motor $k$ and enables the operator to retard at will the drop of the speed of the motor $k$ and to thereby adjust or adapt the course of the starting curve of the windlass in a delicate manner in accordance with the requirements of the service.

As the counter or reverse current supplied to the motor $k$ is further increased by switching off the resistances $r$, such increase will automatically diminish the speed and overcome the action of the motor $s$ as the speed of the motor $k$ continues to drop off, the load or work will be lifted and at an increased rate of lift the quicker the resistances $r$ are cut out of circuit with the motor $k$. As soon as the motor $k$ stops, the load or work will move with half-speed and the auxiliary motor $s$ is switched off after having thus performed its service, and remains ready for use in assisting the motor $k$ afterwards as required.

As the counter or reversed current continues to increase, the motor $k$ then will be correspondingly accelerated but in its opposite revolving direction and thus the load or work attains its highest speed of lift.

When a load or work, suspended from the hook, is to be lowered first the one motor and thereafter also the other motor will be driven by the load so as to act like asynchronous generators to return current into the network. As soon as the lowering movement commences, the one motor will run above synchronism and the other one below synchronism wherefrom a minimum lowering speed ensues. At the same time, a braking action will at once be brought about by the one generator and subsequently by both generators jointly and any desired slow or quick lowering movement will thus be obtained just in accordance with the difference in the speed of the two motors.

What I claim is:—

In a device of the class described, a windlass, a balancing gearing operatively coupled to said windlass, an asynchronous motor operatively coupled to said balancing gearing, a second asynchronous motor also operatively coupled to said balancing gearing, means for controlling said motors whereby both of the same are first caused to run at full speed in such directions with relation to each other that the windlass remains at rest under the action of the balancing gearing thereon, said control means being operable to retard the rotary motion of one of said motors to zero, then to reverse the same and thereafter to accelerate it in the opposite direction to cause the windlass to move a load thereon, said retarding movement of said motor being accomplished by the application to the same of a counter current, and an auxiliary motor coupled to the last named of said motors to counteract the drop of the rotary speed of the same during the retarding movement thereof aforesaid.

RICHARD ECK.